(12) United States Patent
Niu et al.

(10) Patent No.: US 8,099,241 B2
(45) Date of Patent: Jan. 17, 2012

(54) METHOD AND APPARATUS FOR REAL TIME OIL BASED MUD CONTAMINATION MONITORING

(75) Inventors: YuQiang Niu, Beijing (CN); Robert North, Beijing (CN); Chen Lin, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 390 days.

(21) Appl. No.: 12/344,683

(22) Filed: Dec. 29, 2008

(65) Prior Publication Data

US 2010/0169020 A1    Jul. 1, 2010

(51) Int. Cl.
    *G01V 1/40*        (2006.01)
    *E21B 47/08*      (2006.01)
(52) U.S. Cl. .................................. 702/13; 73/152.55
(58) Field of Classification Search .............. 702/1, 6, 702/13; 166/252.5, 60; 703/6, 10
See application file for complete search history.

(56) References Cited

U.S. PATENT DOCUMENTS

| | | | |
|---|---|---|---|
| 3,971,926 A * | 7/1976 | Gau et al. ........................ | 708/3 |
| 7,069,148 B2 | 6/2006 | Thambynayagam et al. | |
| 7,305,306 B2 | 12/2007 | Venkataramanan et al. | |
| 2008/0125973 A1 | 5/2008 | Sherwood et al. | |
| 2008/0156088 A1 | 7/2008 | Hsu et al. | |

FOREIGN PATENT DOCUMENTS

| | | |
|---|---|---|
| WO | WO 2007001746 A1 * | 1/2007 |
| WO | 2009158160 A2 | 12/2009 |

OTHER PUBLICATIONS

International Application No. PCT/US2009/069590, filed Dec. 28, 2009, Notification of Transmittal of the International Search Report and the Written Opinion of the International Searching Authority or the Declaration dated Jun. 7, 2010.
Alpak, et al., "Compositional Modeling of Oil-Based Mud-Filtrate Cleanup During Wireline Formation Tester Sampling", 2006 SPE Annual Technical Conference and Exhibition, Sep. 24-27, 2006, San Antonio, Texas, Copyright 2006, Society of Petroleum Engineers.
Viberti, et al., "A New Approach for Capitalizing on Continuous Downhole Pressure Data", 2005 SPE Annual Technical Conference and Exhibition, Oct. 9-12, 2005, Dallas, Texas, Copyright 2005, Society of Petroleum Engineers.

(Continued)

*Primary Examiner* — Michael Nghiem
*Assistant Examiner* — Manuel Rivera Vargas
(74) *Attorney, Agent, or Firm* — Daryl R. Wright; Hoffman Warnick LLC (57) ABSTRACT

The present invention is a method and apparatus for determining oil based mud contamination of a hydrocarbon fluid obtained from a wellbore during a formation testing. The invention includes receiving a model for simulating the contamination and receiving an empirical equation for computing the contamination. At a given pumping time, a simulated contamination is generated based on the model and an empirically computed contamination is generated based on the first empirical equation. The simulated contamination and empirically computed contamination are compared and a determination as to which is more reliable is made. Revision of the first model or first empirical equation based is then performed.

18 Claims, 4 Drawing Sheets

OTHER PUBLICATIONS

Mullins, et al., "Real-Time Determination of Filtrate Contamination During Openhole Wireline Sampling by Optical Spectroscopy", SPE Annual Technical Conference and Exhibition, Oct. 1-4, 2000, Dallas, Texas, Copyright 2000, Society of Petroleum Engineers.

Athichanagorn, et al., "Processing and Interpretation of Long-Term Data From Permanent Downhole Pressure Gauges", 1999 SPE Annual Technical Conference and Exhibition, Oct. 3-6, 1999, Houston, Texas, Copyright 1999, Society of Petroleum Engineers.

Ueda, et al., "Wavelets: An Elementary Introduction and Examples", UCSC-CRL 94-97, Jan. 17, 1995, Baskin Center for Computer Engineering and Information Sciences, University of California, Santa Cruz, Santa Cruz, CA 95064 USA.

International Application No. PCT/US2009/069590, filed Dec. 28, 2009, Notification Concerning Transmittal of International Preliminary Report on Patentability dated Jul. 7, 2011.

* cited by examiner

METHOD AND APPARATUS FOR REAL TIME OIL BASED MUD CONTAMINATION MONITORING

FIELD OF THE INVENTION

This invention relates to real time oil-based-mud contamination monitoring (OCM) during formation testing.

BACKGROUND OF THE INVENTION

A formation tester tool is deployed downhole in a well bore. The formation tester (FT) withdraws fluids out of the formation by pumping. Initial pressure versus rate response is used to estimate basic reservoir parameters such as fluid mobility and reservoir pressure. Subsequent pumping is then used to acquire representative formation fluid samples. Because of the presence of mud filtrate, it takes some time to get pure formation fluids (fluid from oil zone). Therefore, OCM is applied to monitor the degree of contamination and determine when uncontaminated formation fluids are being sampled.

Oil based mud (OBM) contamination poses a major challenge to the acquisition of representative formation fluids using wireline formation testers (FT). There is a need for a real time determination of OBM to allow for a representative sample to be extracted from a downhole wellbore.

However, predicted OBM contamination from OCM is not particularly accurate and is variable. The performance of OCM changes in real time as a function of fluid volume withdrawn. Moreover, because the measurements are optical-density based, the relative error in OCM predictions increases with decreasing contamination levels and/or with smaller color/density/gas-oil ratio (GOR) contrast between reservoir fluids and contamination. It is in these cases that increased accuracy is needed to ensure the collection of representative formation fluid samples.

The present invention provides real time oil-based-mud contamination monitoring during formation testing having increased accuracy and precision. This allows for sampling of fluids in the wellbore that are not contaminated.

SUMMARY OF THE INVENTION

The present invention is a method and apparatus for determining oil based mud contamination of a hydrocarbon fluid obtained from a wellbore during a formation testing. The invention includes receiving a model for simulating the contamination and receiving an empirical equation for computing the contamination. At a given pumping time, a simulated contamination is generated based on the model and an empirically computed contamination is generated based on an empirical equation. The simulated contamination and empirically computed contamination are compared and a determination as to which is more reliable is made. Revision of the model or the empirical equation based is then performed.

The present invention includes an apparatus for extracting a sample from a formation tester that includes, a system for receiving a model for simulating the contamination and a system for receiving an empirical equation for computing the contamination, for a first pumping time. Simulated contamination is separately generated based on the model. Empirically computed contamination is generated based on the empirical equation. The simulated contamination and the empirically computed contamination are compared and the more reliable and less reliable for the first pumping time are selected. The less reliable one is modified. When the contaminations are sufficiently small such that the hydrocarbon fluid qualifies as a representative fluid sample for the formation testing a fluid sample is extracted from the formation tester.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which.

For a better understanding of the present invention together with other advantages and capabilities thereof, reference is made to the following detailed description and appended claims.

DETAILED DESCRIPTION

Figure 1:
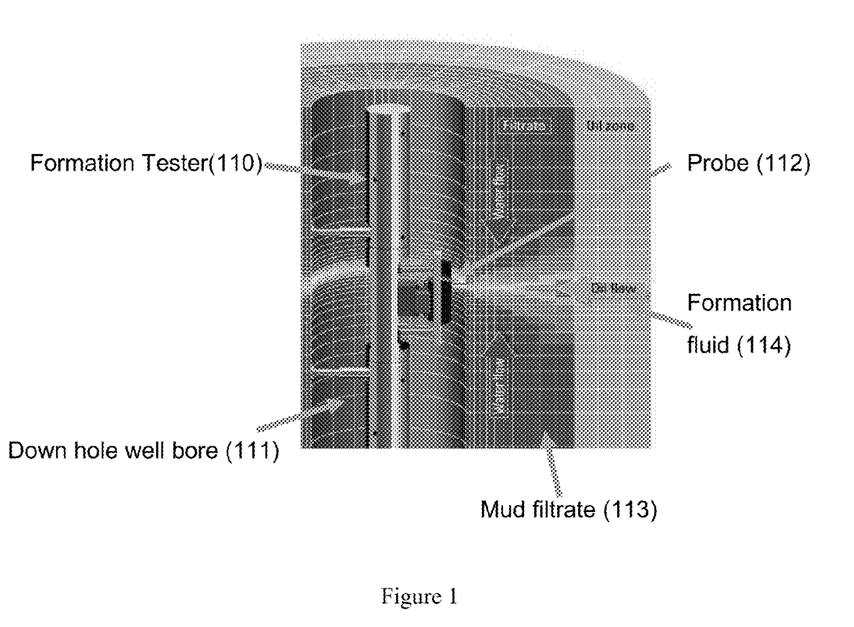
FIG. 1 shows a sample probe used to extract a sample from a wellbore.

FIG. 1 illustrates a cross section of a wellbore showing how a sample is taken. A formation tester (FT) tool 110 is deployed downhole in a well bore 111. A probe 112 extends from the tool 110 to provide a flow path between the formation and the tool's internal sampling system. The formation tester tool 110 withdraws fluids out of the formation by developing a pressure differential between the formation and the sampling system. The initial fluids are a combination of mud filtrate 113 and formation fluid 114. Fluids are withdrawn for a period of time to minimize the level of mud filtrate contamination and provide a good evaluation of the formation fluid.

During the fluid withdrawal pressure versus rate response is used to estimate basic reservoir parameters such as fluid mobility and reservoir pressure. Additionally the fluid is analyzed by an optical spectrometer for optical density to determine the level of mud filtrate contamination.

The optical density contamination computation is based on the principle of changing color and/or methane content with time. Color and methane can be used to differentiate mud filtrate from formation fluids. To determine the level of contamination, an empirical function is introduced, which assumes that the contamination is a time function and scales with $t^{5/12}$.

The empirical OCM method is outlined below:
The level of OBM contamination is determined by first fitting the optical density difference to a model:

$$\text{Fitted\_Optical\_Density} = C - D \times t^{-\frac{5}{12}} \qquad \text{Equation-1}$$

After the parameters C and D are solved by using a parameter estimation method the percent of OBM contamination is computed by:

$$\text{Contamination} = 100 \times \frac{C - \text{Fitted\_Optical\_Density}}{C} \qquad \text{Equation-2}$$

However, OCM constitutes a semi-empirical, parametric, real-time algorithm and the parameters that govern the OCM predictions are functions of sampling time.

Therefore, the performance of OCM changes in real time as a function of fluid volume withdrawn during clean-up. Moreover, because the measurements are optical-density based, the relative error in OCM predictions increases with decreasing contamination levels and/or with smaller color/density/GOR contrast between reservoir fluids and contamination. It is in these cases that increased accuracy is needed to ensure the collection of representative formation fluid samples.

Figure 2:
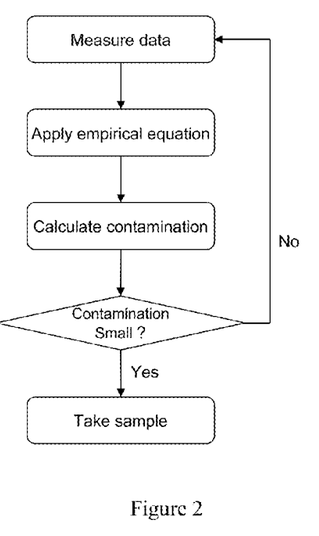
FIG. 2 is a block diagram of method of analyzing formation tester fluids for mud filtrate contamination using optical density measurements.
Figure 3:
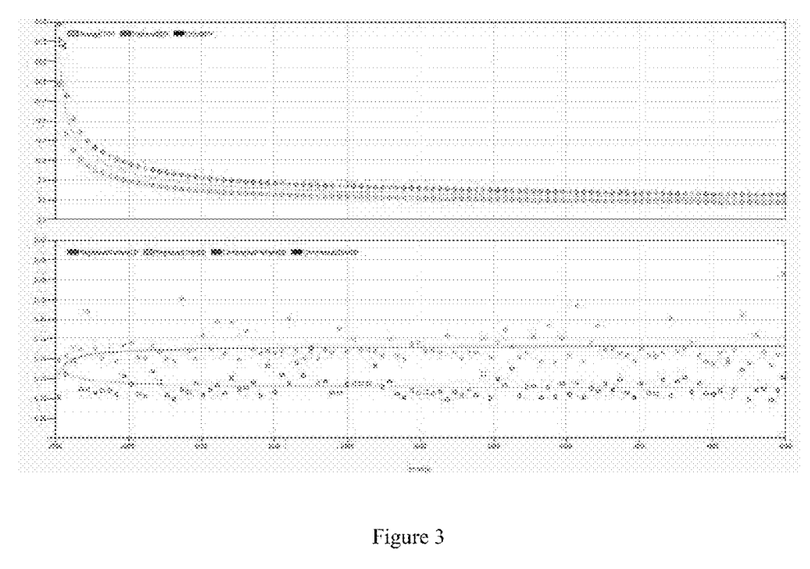
FIG. 3 shows field result from an empirical OCM computation, with the bottom plot showing regressed results and the top plot showing the contamination results.

FIG. 2 shows a process of taking a sample in field. The optical density is measured when the fluids are circulating through the formation tester. Simultaneously the empirical method is applied (Equation-1). Then the OBM contamination can be computed with Equation-2. If the contamination is small enough or alternatively, the fluid is pure, the sample can be taken. If not, the sample will not be taken and fluid evaluation continues. FIG. 3 shows one field result from empirical OCM computation. The bottom plot shows the regressed results with Equation-1. The top plot shows the contamination results.

Figure 4:
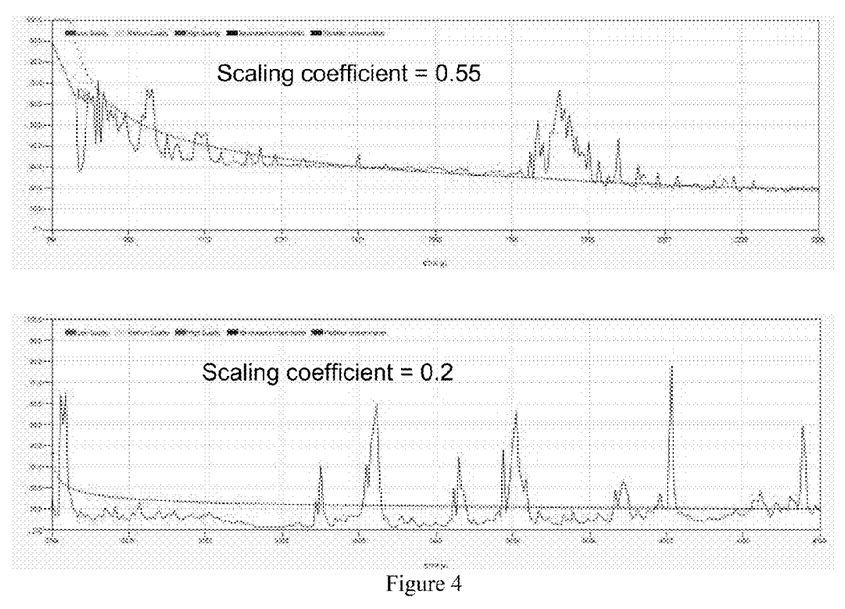
FIG. 4 shows the field results from empirical OCM computation using predicted scaling coefficients.

Since the introduction of the empirical method, recent research has reported that the scaling coefficient $5/12$ is variable with time. This causes problems in predicting the contamination. Wireline formation test interpretation methods have been evolving to more accurately predict the scaling coefficient, but the process is complex. FIG. 4 shows the results by applying the latest algorithm. The top plot shows the contamination results with the scaling coefficient as 0.55 for time interval from 794s to 2386s. The bottom plot shows the contamination results with the scaling coefficient as 0.2 for time interval from 2798s to 4566s. From these results it is evident that even for the same job, the scaling coefficient varies considerably. Therefore, the predicted OBM contamination from the empirical OCM method alone can have large uncertainties.

Besides the empirical optical density method discussed above, numerical simulation methods can be used to predict OBM contamination levels. The simulation methods have a wide variety of applications in formation testing however they have not been applied to real time formation testing jobs because the history matching based simulation is very time-consuming. Usually a complete simulation takes days or weeks, while a well test job takes only a few hours even a few minutes. Therefore it is not practical to apply the simulation method to formation testing jobs. The simulation method has never been applied in well-test real-time jobs.

Fast simulators are now available and can be applied to implement history matching, which meets the requirements of carrying out reservoir simulation in real time. The above simmulator could be semi-analytical or analytical. An example of this is GREAT as described in U.S. Pat. No. 7,069,148, incorporated by reference herein. Estimates for the initial simulation model can come directly from the formation testing measurements of rate and pressure.

U.S. Pat. No. 7,069,148, describes a Gas Reservoir Evaluation and Assessment Tool (GREAT) which is a semi-analytical simulation method for reservoir simulation. It is fast and accurate in dealing with complex formation problems. This model is used to predict pressure and other production characteristics of a reservoir. Using this model one can obtain predictions of OBM contamination during formation tester sampling.

The GREAT simulation receives input data pertaining to a reservoir. It then creates a model and matches the predictive model values with real-time data. This is accomplished by calculating the reservoir model predictive values in one dimension associated with a single layer in said reservoir, each of the reservoir model predictive values existing a single point in space in the reservoir and at a single point in time in the reservoir. The next step is to calculate the reservoir model predictive values in one dimension associated with multiple layers in the reservoir, each of the reservoir model predictive values in one dimension existing at a single point in space in the reservoir and at a single point in time in the reservoir. Then GREAT calculates the reservoir model predictive values in three dimensions associated with multiple layers in said reservoir, each of the reservoir model predictive values in each of said multiple layers in three dimensions existing at a single point in space in the reservoir and at a single point in time is the reservoir. Finally, GREAT calculates the reservoir model predictive values in three dimensions as a function of time, the values being associated with multiple layers in the reservoir, each of the reservoir model predictive values in each of the multiple layers in three dimensions existing as a single point in space in said reservoir, each of the reservoir model predictive values in the multiple layers in three dimensions existing at any future point in time in said reservoir. This is a preferred method of semi-analytical computer modeling although other embodiments are possible.

Using both the semi-analytical simulation model (e. g., GREAT) and the OCM method simultaneously, one can obtain improved and consistent OBM contamination evaluation.

Figure 5:
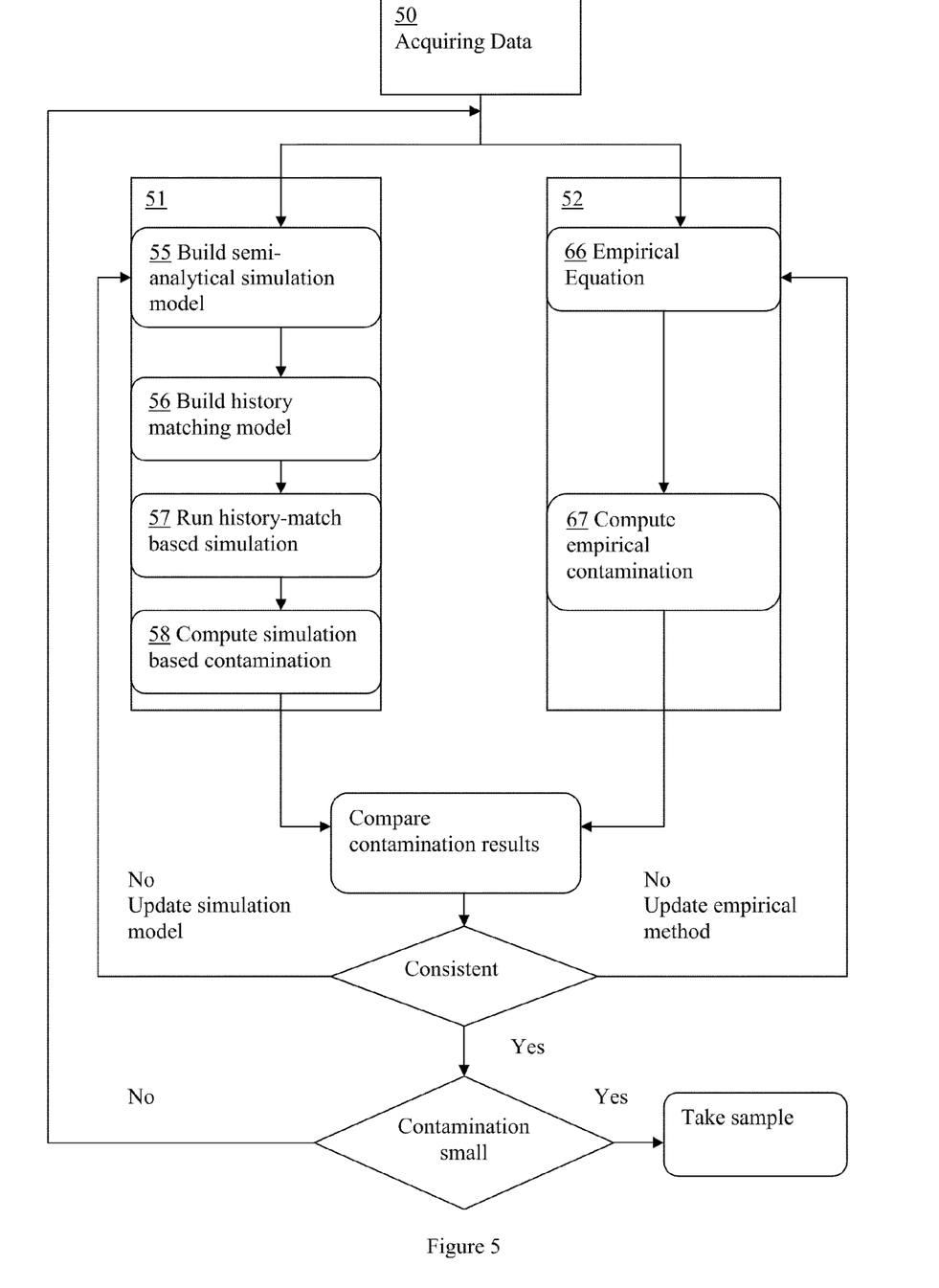
FIG. 5 is a block diagram of the method of the present invention for retrieving a downhole formation sample.

FIG. 5 shows the general workflow for the present invention. The left workflow represents the simulation method 51 and the right workflow represents the empirical optical density method 52.

The workflow starts with fluid and data acquisition 50 and continues in real time throughout the test period.

The simulation workflow includes building the simulation model 55, building history-matching model 56, running a simulation 57 and estimating contamination 58. Here, the simulation model is a fast model as described previously. Inputs for building the simulation model come from analysis of the beginning stages of the formation test. The pressure and rate measurements are used for the history match.

The empirical optical density method starts with the default equations 66 and calculates the contamination 67 from the scaling coefficient and the regression parameters.

Each method runs independently and the results are compared. If the results are inconsistent, the simulation model and the empirical equation are updated accordingly. For example, if the reservoir information has been well-known, it is safe to say that the constructed simulation model describes the real formation and the computed result is of more accuracy. Then the parameters (scaling coefficient, parameter C and D in Equation-1) computed from empirical method should be updated. While, if the known reservoir information is limited, it is safer to depend on the empirical method and the constructed simulation model (formation/fluid parameters) should be updated. After updating, the process repeats until and acceptable match is achieved.

When the results are consistent the contamination level is considered valid. This level of contamination is then evaluated to determine if the fluid is representative of the formation fluid. If it is, a sample can be taken. If not, fluid extraction and analysis continues.

It is understood that a computer system may be implemented as any type of computing infrastructure. A computer system generally includes a processor, input/output (I/O), memory, and at least one bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. A bus provides a communication link between each of the components in the computer system and likewise may comprise any known type of transmission link, including electrical, optical, wireless, etc. Although not shown, additional components, such as cache memory, communication systems, system software, etc., may be incorporated into a computer system. Local storage may comprise any type of read write memory, such as a disk drive, optical storage, USB key, memory card, flash drive, etc.

Access to a computer system and network resources may be provided over a network such as the Internet, a local area network (LAN), a wide area network (WAN), a virtual private network (VPN), wireless, cellular, etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It is understood that in addition to being implemented as a system and method, the features may be provided as a program product stored on a computer-readable medium. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

The invention has been described in detail with particular reference to certain preferred embodiments thereof, but it will be understood that variations and modifications can be effected within the spirit and scope of the invention.

We claim:

1. A method of determining oil based mud contamination of a hydrocarbon fluid obtained from a wellbore during formation testing, the method comprising:
receiving a reservoir model for simulating the contamination using a microprocessor;
receiving an empirical equation for computing the contamination using the microprocessor wherein the empirical equation for computing the contamination comprises $$\text{Fitted\_Optical\_Density} = C - D \times t^{-\frac{5}{12}}$$

wherein t equals time, C and D are solved by using a parameter estimation method to fit acquired data and the percent of contamination is computed by:

$$\text{Contamination} = 100 \times \frac{C - \text{Fitted\_Optical\_Density}}{C};$$

for a first pumping time, separately generating a simulated contamination based on the reservoir model and an empirically computed contamination based on the empirical equation contamination using the microprocessor;
comparing the simulated contamination and the empirically computed contamination using the microprocessor;
selecting one of the reservoir model and the empirical equation as more accurate and another one as less accurate for the first pumping time using the computer; and
revising the less accurate one of the reservoir model and the empirical equation based on a result of the comparing.

2. The method according to claim 1, further comprising:
revising the less accurate one of the reservoir models based on a result of the selecting; and
for a second pumping time, repeating the generating, comparing, selecting and revising operations.

3. The method according to claim 1, wherein in the case the empirical equation is selected as the less accurate one of the reservoir models, revising at least one of: a fitting parameter, or a power of the first pumping time.

4. The method according to claim 1, wherein the simulated contamination generating includes:
building a history-matching model based on the reservoir model; and
implementing history-matching using the history-matching model.

5. The method according to claim 1, wherein the reservoir model is a semi-analytical simulator.

6. The method according to claim 1, wherein in a case that the simulated contamination and the empirically computed contamination are sufficiently consistent according to a preset threshold, further comprising determining whether the contaminations are sufficiently small such that the hydrocarbon fluid qualifies as a representative fluid sample for the formation testing.

7. The method according to claim 1, wherein the generating, comparing, selecting and revising operations are implemented in substantially real time with the formation testing.

8. The method according to claim 4, wherein the comparing is iterated until the simulated contamination obtained from the history-matching model matches the empirically computed contamination to a preset extent.

9. The method according to claim 1 wherein receiving the reservoir model for simulating the contamination comprises:
(a) receiving input data characterizing a reservoir;
(b) producing the reservoir model in response to said input data representing said reservoir in multi dimensions;
(c) verifying the reservoir model; and
(d) using said reservoir model, generating the simulated contamination in said reservoir in response to the verifying step.

10. The method according to claim 9 wherein the producing includes the steps of:
(b1) calculating the oil based mud contamination of a hydrocarbon fluid obtained from a wellbore in one dimension associated with a single layer in said reservoir, the oil based mud contamination existing at a single point in space in said reservoir and at a single point in time in said reservoir,
(b2) calculating the oil based mud contamination in said one dimension associated with multiple layers in said reservoir, the oil based mud contamination in each of said multiple layers existing at a single point in space in said reservoir and at a single point in time in said reservoir,
(b3) calculating the oil based mud contamination in three dimensions associated with said multiple layers in said reservoir, the oil based mud contamination in each of said multiple layers in said three dimensions existing at a single point in space in said reservoir and at a single point in time in said reservoir,
(b4) calculating the oil based mud contamination in said three dimensions, said values being associated with said multiple layers in said reservoir, the oil based mud contamination in each of said multiple layers in said three dimensions existing at a single point in space in said reservoir, the oil based mud contamination in said each of said multiple layers in said three dimensions existing at any future point in time in said reservoir.

11. A non-transitory computer readable medium having a computer program product stored thereon for determining oil based mud contamination of a hydrocarbon fluid obtained from a wellbore during formation testing that when executed on a computer comprises:
receiving a reservoir model for simulating the contamination;
receiving an empirical equation for computing the contamination wherein the empirical equation for computing the contamination comprises $$\text{Fitted\_Optical\_Density} = C - D \times t^{-\frac{5}{12}}$$

wherein t equals time, C and D are solved by using a parameter estimation method to fit acquired data and the percent of contamination is computed by:

$$\text{Contamination} = 100 \times \frac{C - \text{Fitted\_Optical\_Density}}{C};$$

for a first pumping time, separately generating a simulated contamination based on the reservoir model and an empirically computed contamination based on the empirical equation;
comparing the simulated contamination and the empirically computed contamination;
selecting one of the reservoir model and the empirical equation as more accurate and another one as less accurate for the first pumping time; and
revising the less accurate one of the reservoir model and the empirical equation based on a result of the comparing.

12. The non-transitory computer readable medium according to claim 11, further comprising:
revising the less accurate one of the reservoir models based on a result of the selecting; and
for a second pumping time, repeating the generating, comparing, selecting and determining operations.

13. The non-transitory computer readable medium according to claim 11, wherein in the case the empirical equation is selected as the less accurate one of the reservoir models, revising at least one of: a fitting parameter, or a power of the first pumping time.

14. The non-transitory computer readable medium according to claim 11, wherein the simulated contamination generating includes:
building a history-matching model based on the reservoir model; and
implementing history-matching using the history-matching model.

15. The non-transitory computer readable medium according to claim 11, wherein the reservoir model is a semi-analytical simulator.

16. An apparatus comprising:
a) a system for implementing a reservoir model for simulating the contamination;
b) a system for implementing an empirical equation for computing the contamination, for a first pumping time, separately generating a simulated contamination based on the reservoir model and an empirically computed contamination based on the empirical equation wherein the empirical equation for computing the contamination comprises $$\text{Fitted\_Optical\_Density} = C - D \times t^{\frac{5}{12}}$$

wherein t equals time, C and D are solved by using a parameter estimation method to fit acquired data and the percent of contamination is computed by:

$$\text{Contamination} = 100 \times \frac{C - \text{Fitted\_Optical\_Density}}{C};$$

c) a system for comparing the simulated contamination and the empirically computed contamination;
d) a system for selecting one of the reservoir model and the empirical equation as more accurate and another one as less accurate for the first pumping time;
e) a system for revising the less accurate one of the reservoir model and the empirical equation based on a result of the comparing until the simulated contamination and the empirically computed contamination are within a preset limit; and
f) a system determining whether the simulated contamination and the empirically computed contamination are sufficiently small such that the hydrocarbon fluid qualifies as a representative fluid sample for the formation testing, and if not implementing the system for selecting for a second pumping time.

17. The apparatus according to claim 16, wherein the system for generating simulating contamination includes:
   building a history-matching model based on the reservoir model; and
   implementing history-matching using the history-matching model.

18. The apparatus according to claim 16, wherein the reservoir model is a semi-analytical simulator.

\* \* \* \* \*